United States Patent Office 3,729,355
Patented Apr. 24, 1973

3,729,355
METHOD FOR THE PRODUCTION OF COMPOSITE PLATES
Jean Schrade, Zurich, Switzerland, assignor to Swiss Aluminium Ltd., Chippis, Switzerland
No Drawing. Filed Apr. 14, 1971, Ser. No. 134,041
Claims priority, application Switzerland, Apr. 29, 1970, 6,429/70
Int. Cl. B32b *31/20*
U.S. Cl. 156—283                                  6 Claims

ABSTRACT OF THE DISCLOSURE

A method for the production of a composite plate having two metal sheets and a thermosetting synthetic resin therebetween involves sinter molding said resin between said metal sheets whereby said resin will be hardened and will be substantially porous.

Reference is had to my co-pending application, Ser. No. 69,820, filed on Sept. 4, 1970, now Pat. No. 3,660,207.

BACKGROUND OF THE INVENTION

It is known to produce composite materials in a manner such that a metal sheet is cemented onto a core consisting of a thermoplastic synthetic resin. All thermoplastics, which may nowadays be used are for technical reasons and economical reasons melted when exposed to heat (100 to 150° C.) or soften at this temperature range. Thermoplastics which contain large quantities of halogen, when exposed to high temperatures, can react in an explosive manner with certain metals, such as aluminum, magnesium or zinc. This has become evident in the course of socalled "fire-experiments" in which the temperature of the sheet metal facing the direction of the fire-source, had attained a temperature of about 450° C. Under the influence of heat, the synthetic resin disintegrated and formed chlorine and hydrochloric acid, both of which reacted extremely quickly with the metals at the given temperature, whereby a large quantity of heat of formation is liberated which accelerates the decomposition of the synthetic resin.

For these reasons, it has been recommended that composite materials consisting of thermoplastics and metal sheets should not be used, or used only to a limited extent, in the field of construction engineering, if for no other reason than fire protection.

Among the socalled duro-plastic (thermosetting) plastic condensates of phenol, urea or melamine with formaldehyde (the socalled "Pheno-Plastics" and "Amino-Plastics"), especially if they also contain mineral additives, have been known for a long time for their flame-resistancy. Processable mixtures of Pheno-Plastics or Amino-Plastics with mineral additives are commercially available as socalled "molding masses."

The processing of these socalled "molding masses" to molded pieces requires temperatures ranging from about 150 to about 200° C. and pressures ranging from between about 50 and about 200 kilograms per square centimeter (kg./cm.$^2$). This pressure is necessary, in order to effect flowing of the resin and to oppose the steam pressure created by vaporization of the water product of the reaction. If lower pressures are used, the molded piece will contain shrinkage holes and an accompanying unattractive surface; the holes greatly reducing the mechanical stability of the molded piece.

SUMMARY OF THE INVENTION

It is accordingly one of the principal objects of the instant invention to avoid the drawbacks of the prior art.
It is another object of the instant invention to provide for a method for the production of composite plates comprised of a metal and a thermosetting plastic resin.

It is yet another object to provide for such a method which is operable to use existing machinery with relatively little or no additional tooling, thereby minimizing expenses.

Broadly speaking, the instant method is carried out with the aid of a granular molding mass which is principally comprised of a hardenable or thermosetting synthetic resin. The resin may be placed as a core between two sheets of metal which are subjected to pressure such that when hardened the synthetic resin core will as explained below display a porous structure. In order to satisfactorily retain the composite construction the metal sheets may in addition be covered on the inside with a suitable adhesive maetrial prior to the pressing operations. (Reference is had to U.S. patent applications Ser. No. 5,040 of Emanuel Wolf, filed on Jan. 22, 1970, now Pat. No. 3,647,590; Ser. No. 41,923 of Dietrich Altenpohl, filed on June 1, 1970, now Pat. No. 3,623,943 and Ser. No. 131,801 of Walter Muller, filed on Apr. 6, 1971.)

The porous structure of the synthetic resin core is attained by using low pressure during the plasticization process, whereby the individual grains of the molding mass will sinter together while at the same time leaving hollow spaces therebetween. Because of the foregoing the grains do not flow together and thus remain porous. The density of the thus hardened core lies below the theoretical density of the synthetic resin utilized.

The present invention allows one to use significantly lower pressures during the production of composite sheets than heretofore used, such as in the production of pieces of hardenable or thermo-setting molding masses. Preferred, pressures in accordance with the instant invention, are between 2 and 10 kilograms per square centimeter (kg./cm.$^2$). This results in many advantages such as the following.

Installations using these composite plates can be constructed more easily and with less expense. The reason being that the composite plates as aforesaid, contain hollow spaces in the core since the molding mass due to the slight pressure involved during sintering cannot fill up all the hollow spaces. The density is thereby reduced and so is the manufacturing expense since a smaller quantity of the molding mass is required for any given volume.

While it is true that a porous core displays a lesser mechanical stability than one which had been produced under high pressure, this is not any material disadvantage here as the instant core lies between two firm, solid, rigid or compact pieces of sheet metal and therefore practically serves solely as a spacer.

An adhesive of well-known, suitable composition, such as for example, "Lupolen," may be placed between each metal sheet and the resin core, before the sinter molding operation. The hardenable or thermo-setting resins, used can be any of the known ones, such as, but not limited to phenolic formaldehyde resins, melamine formaldehyde resins, and urea-formaldehyde resins. They can contain the usual well known additives, such as mineral fillers, for example, in quantities about of 30 to about 60% by weight, to increase their refractoriness or fireproof quality.

DETAILED DESCRIPTION OF THE INVENTION

For a fuller understanding of the nature and objects of the invention, reference should be had to the following detailed description, taken in connection with the accompanying examples, which are not to be considered as limiting, and which illustrate details of the method of producing the hereinabove composite plate.

Example 1

Onto two sheets of metal such as aluminum either pure or alloyed having a 8 mm. thickness, there is applied an adhesive material in the form of a 70 μm. thick phenolic resin which had earlier been modified with a polyvinyl formaldehydeacetal.

The first sheet is placed into a form or mold which is closed on all sides and has a 7 mm. high border, the side onto which the adhesive material had been applied facing upward. Subsequently, the form is completely filled with an asbestos phenolic-molding mass, type PFPA (VSM-Standard 77202), having a grain size of 4 mm., any excess having been removed earlier. The second sheet, with the already applied adhesive material facing downwards and a dummy sheet having a thickness of 2.5 mm., are laid on top of the molding mass. In a platen press, pressure is exerted for 10 minutes at 180° C. with a pressure of 7 kilogram per centimeter squared (kg./cm.$^2$).

After shaping and cooling, the following characteristics of the composite plate were measured: core density=1.45 grams per cubic centimeter); adhesive strength of the plate=25 kg. cm. per cm., determined as socalled "peeling-moment" in accordance with the ASTM-Standards 1781. Such a plate passed the well-known German fire-pit test in accordance with the German Standard Specification DIN 4102.

Not only flat composite plates, but also profiled composite plates, for instance, corrugated composite plates can be produced by the instant method. The metal cover sheets may be made of known metals and alloys, such as aluminum and alloys thereof as previously stated, and can also be comprised of different materials on both core sides and can display surfaces with any kind of finish.

Example 2

This example is similar to Example 1. However, in this case a composite plate is prepared by applying an epoxy-resin adhesive material onto the metal sheet and by using a phenolic melamine molding mass, type MFMA (VSM-Standard 77 202), of a grain size of 3 mm. The content of melamine resin causes a decrease of the pressing or molding temperature to about 150° C., but brings with it an increase in the pressing or molding-time to about 20 minutes.

The characteristic properties of the composite plate obtained in this manner resemble those of the plate of Example 1.

I wish it to be understood that I do not desire to be limited to the exact details of processing described for obvious modifications will occur to a person skilled in the art.

Having thus described the invention, what I claim as new and desire to be secured by Letters Patent, is as follows:

1. A method for the production of a composite plate having two metal sheets and a thermosetting synthetic resin therebetween, the steps comprising:
   applying a granulated resin between the metal sheets,
   sinter molding said resin between said metal sheets at a pressure sufficiently low whereby said resin will be hardened and be set into a substantially porous structure.

2. A method, as claimed in claim 1, wherein said sinter molding is carried out at a pressure of from about 2 to about 10 kilograms per square centimeter.

3. A method, as claimed in claim 1, wherein said resin is selected from the group consisting of phenol formaldehyde, urea formaldehyde, and melamine formaldehyde.

4. A method, as claimed in claim 1, wherein said resin is comprised of a mixture of thermosetting synthetic materials.

5. A method, a claimed in claim 1, and adding to said resin from about 30 to about 60 percent by weight of filler material.

6. A method, as claimed in claim 1, and contacting said metal layer with an adhesive prior to said sinter molding.

References Cited

UNITED STATES PATENTS

| | | | |
|---|---|---|---|
| 2,092,502 | 9/1937 | Ellis | 156—306 X |
| 3,348,991 | 10/1967 | Abell et al. | 156—306 X |
| 3,517,805 | 6/1970 | Gould | 264—126 X |
| 2,499,134 | 2/1950 | De Bruyne | 156—283 |
| 3,347,728 | 10/1967 | Preothe et al. | 156—283 |

FOREIGN PATENTS

| | | | |
|---|---|---|---|
| 857,933 | 1/1961 | Great Britain | 156—306 |

ALFRED L. LEAVITT, Primary Examiner

C. WESTON, Assistant Examiner

U.S. Cl. X.R.

117—21; 156—306